US008311657B2

(12) United States Patent
Cannistraro et al.

(10) Patent No.: US 8,311,657 B2
(45) Date of Patent: *Nov. 13, 2012

(54) METHOD AND APPARATUS FOR EFFICIENTLY ACCOUNTING FOR THE TEMPORAL NATURE OF AUDIO PROCESSING

(75) Inventors: Alan C. Cannistraro, San Francisco, CA (US); William George Stewart, Cupertino, CA (US); Roger A. Powell, Burlingame, CA (US); Kevin Christopher Rogers, Albany, CA (US); Kelly B. Jacklin, Cupertino, CA (US); Doug Wyatt, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 12/126,808

(22) Filed: May 23, 2008

(65) Prior Publication Data

US 2008/0222525 A1  Sep. 11, 2008

Related U.S. Application Data

(63) Continuation of application No. 10/407,847, filed on Apr. 5, 2003, now Pat. No. 7,426,417.

(51) Int. Cl.
*G06F 17/00* (2006.01)
*H03G 3/00* (2006.01)
*H04R 29/00* (2006.01)
*G10L 11/00* (2006.01)
*G10L 19/00* (2006.01)
*G10H 1/02* (2006.01)

(52) U.S. Cl. ............ 700/94; 381/61; 381/56; 704/278; 704/500; 704/270; 84/737; 84/701; 84/662; 84/626

(58) Field of Classification Search .................... 700/94; 715/716; 381/61–63, 314, 119, 56; 704/278, 704/500, 501; 84/693, 737, 659–668, 626
See application file for complete search history.

(56) References Cited

U.S. PATENT DOCUMENTS 6,240,086 B1  5/2001  Morgan et al.
7,426,417 B1  9/2008  Cannistraro et al.

OTHER PUBLICATIONS

AAPA, Figure 6, pp. 9, line 4—p. 10, line 3; p. 14, lines 4-7. No date avaialable.*
Applicant's admitted prior art, Figure 6, p. 9, line 4-p. 10, line 3; p. 14, lines 4-7. No date available.*
Non-Final Office Action of U.S. Appl. No. 10/407,847, Jan. 11, 2007 (mailing date), Cannistraro, Alan, et al.

(Continued)

*Primary Examiner* — Devona Faulk
(74) *Attorney, Agent, or Firm* — Adeli & Tollen LLP

(57) ABSTRACT

Some embodiments of the invention provide a computer system for processing an audio track. This system includes at least on DSP for processing the audio track. It also includes an application for editing the audio track. To process audio data in a first interval of the audio track, the application first asks and obtains from the DSP an impulse response parameter related to the DSP's processing of audio data. From the received impulse response parameter, the application identifies a second audio track interval that is before the first interval. To process audio data in the first interval, the application then directs the DSP to process audio data within the first and second intervals.

29 Claims, 5 Drawing Sheets

OTHER PUBLICATIONS

Non-Final Office Action of U.S. Appl. No. 10/407,847, Aug. 27, 2007 (mailing date), Cannistraro, Alan, et al.
Notice of Allowance of U.S. Appl. No. 10/407,847, Feb. 22, 2008 (mailing date), Cannistraro, Alan, et al.
Portions of prosecution history of U.S. Appl. No. 10/407,847, May 20, 2008, Cannistraro, Alan C., et al.
Updated portions of prosecution history for U.S. Appl. No. 10/407,847, Jul. 28, 2008, Cannistraro, Alan C., et al.

* cited by examiner

METHOD AND APPARATUS FOR EFFICIENTLY ACCOUNTING FOR THE TEMPORAL NATURE OF AUDIO PROCESSING

CLAIM OF BENEFIT TO PRIOR APPLICATIONS

This application is a continuation application of U.S. patent application Ser. No. 10/407,847, now issued as U.S. Pat. No. 7,426,417, filed Apr. 5, 2003, entitled "Method and Apparatus for Efficiently Accounting for the Temporal Nature of Audio Processing." U.S. patent application Ser. No. 10/407,847, now issued as U.S. Pat. No. 7,426,417 is incorporated herein by reference.

FIELD OF THE INVENTION

The present invention is directed towards a method and apparatus for efficiently accounting for the temporal nature of audio processing.

BACKGROUND OF THE INVENTION

Audio processing applications often apply digital signal processing ("DSP") operations that intentionally modify the audio content of an audio track. These operations typically cause audio events in the audio data to have an effect in the audio presentation for an extended period of time. In other words, certain DSP operations can cause an audio event to leave a trailing sound effect in the audio presentation even after the event finishes. Such a sound effect affects the audio presentation in the absence of a subsequent audio event. It also affects the sound generated during a subsequent audio event. Accordingly, audio processing applications need to account for the temporal effects that can result from applying certain signal processing operations on audio data. To account for such temporal effects on audio data that is within a particular interval of a track, audio processing applications need to consider audio data before and/or after the particular interval.

Audio processing applications also re-encode audio data. Re-encoding audio data might entail re-sampling the audio data, reducing the number of audio samples, increasing the number of audio samples, changing the encoding format for the audio samples, etc. When such applications re-encode an interval of an audio track, they often need to account for a certain number of samples before and after the interval, because of the temporal nature of audio data.

Accordingly, in a variety of contexts, audio processing applications need to account for the effects of audio data that is before and/or after a particular segment of audio data that the applications are processing. For such contexts, there is a need in the art for a method that efficiently accounts for the temporal nature of audio processing.

SUMMARY OF THE INVENTION

Some embodiments of the invention provide a computer system for processing an audio track. This system includes at least one DSP for processing the audio track. It also includes an application for editing the audio track. To process audio data in a first interval of the audio track, the application first asks and obtains from the DSP an impulse response parameter related to the DSP's processing of audio data. From the received impulse response parameter, the application identifies a second audio-track interval that is before the first interval. To process audio data in the first interval, the application then directs the DSP to process audio data within the first and second intervals.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Audio Processing System

Figure 1:
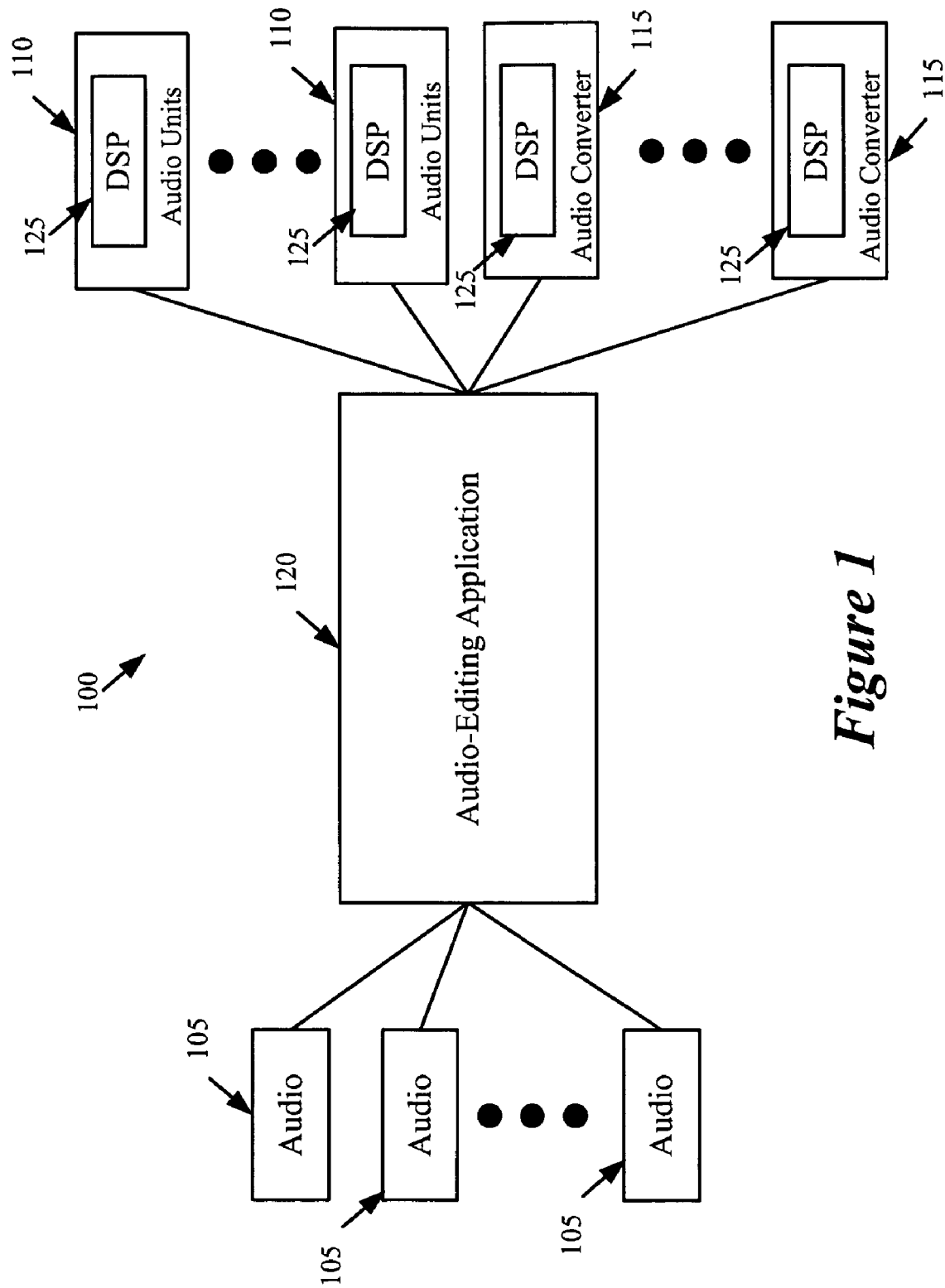
FIG. 1 illustrates the software architecture of a computer system that is used in conjunction with some embodiments of the invention.

FIG. 1 illustrates the software architecture of a computer system 100 that is used in conjunction with some embodiments of the invention. As shown in this figure, this computer system includes several audio tracks 105, several audio units 110, several audio converters 115, and an audio-editing application 120. A user of the computer system 100 can interact with the audio-editing application 120 to edit and combine audio tracks 105 in order to make an audio presentation.

To create an audio presentation, the audio-editing application 120 might direct one or more audio units 110 to modify the audio content of one or more audio tracks by performing a set of DSP operations on the audio content. In other words, each audio unit 110 performs a set of DSP operations on audio data that it receives from the audio application, in order to change this audio data.

To create an audio presentation, the audio-editing application 120 might also direct one or more audio converters 115 to format the audio data. Each audio converter 115 performs a particular set of DSP operations on the audio data that it receives from the application 120, in order to encode or change the encoding of the audio data. Examples of different encoding operations include re-sampling the audio data, reducing the number of audio samples, increasing the number of audio samples, translating the audio encoding from one standard (e.g., an mp3 format) to another standard (e.g., linear PCM format). The encoding of the audio data might also change the audio data, as some encodings (such as mp3) are lossy. However, the difference between an audio converter and an audio unit is that the operations of the audio unit are designed to change the received audio content, while the operations of the audio converter are designed to keep the received audio content as close to the original content as possible. The resulting change due to an audio converter's operation is typically undesirable and unavoidable.

As shown in FIG. 1, each audio unit 110 or converter 115 includes a DSP 125, which might be formed by one individual digital signal processor or by several individual digital signal processors. An audio unit 110 uses its DSP to perform its content-modifying operations, while a converter 115 uses its DSP to perform its encoding operation. To use an audio unit 110 or a converter 115 to process audio data in a first interval of the audio track, the audio-editing application 120 first asks and obtains from the audio unit or converter a duration parameter related to its DSP's processing of audio data. From the received duration parameter, the application 120 identifies a second audio-track interval that is before the first interval. To process audio data in the first interval, the application then directs the DSP to process audio data within the first and second time intervals.

In some embodiments, the duration parameter specifies the duration of the impulse response of the DSP. In the case when the DSP is part of an audio converter 115 that re-encodes the audio data, the duration parameter is called a priming duration parameter. A priming duration parameter specifies the amount of audio data that the audio conversion operation needs to consider before or after a particular interval in order to process audio data within the particular time interval. A pre-priming parameter specifies the duration of audio data to consider before the particular interval, while a post-priming parameter specifies the duration of audio data to consider after the particular interval.

The duration parameter can be expressed differently in different situations. For instance, it can be expressed in terms of time (i.e., it can directly express the duration of a time interval, e.g., 0.5 seconds). It also can be expressed in terms of a number of samples (e.g., it can specify 10 samples). The sample count is converted into a time interval in some cases, while it is directly used in other cases.

II. Interaction Between the Audio-Editing Application and an Audio Unit

Figure 7:
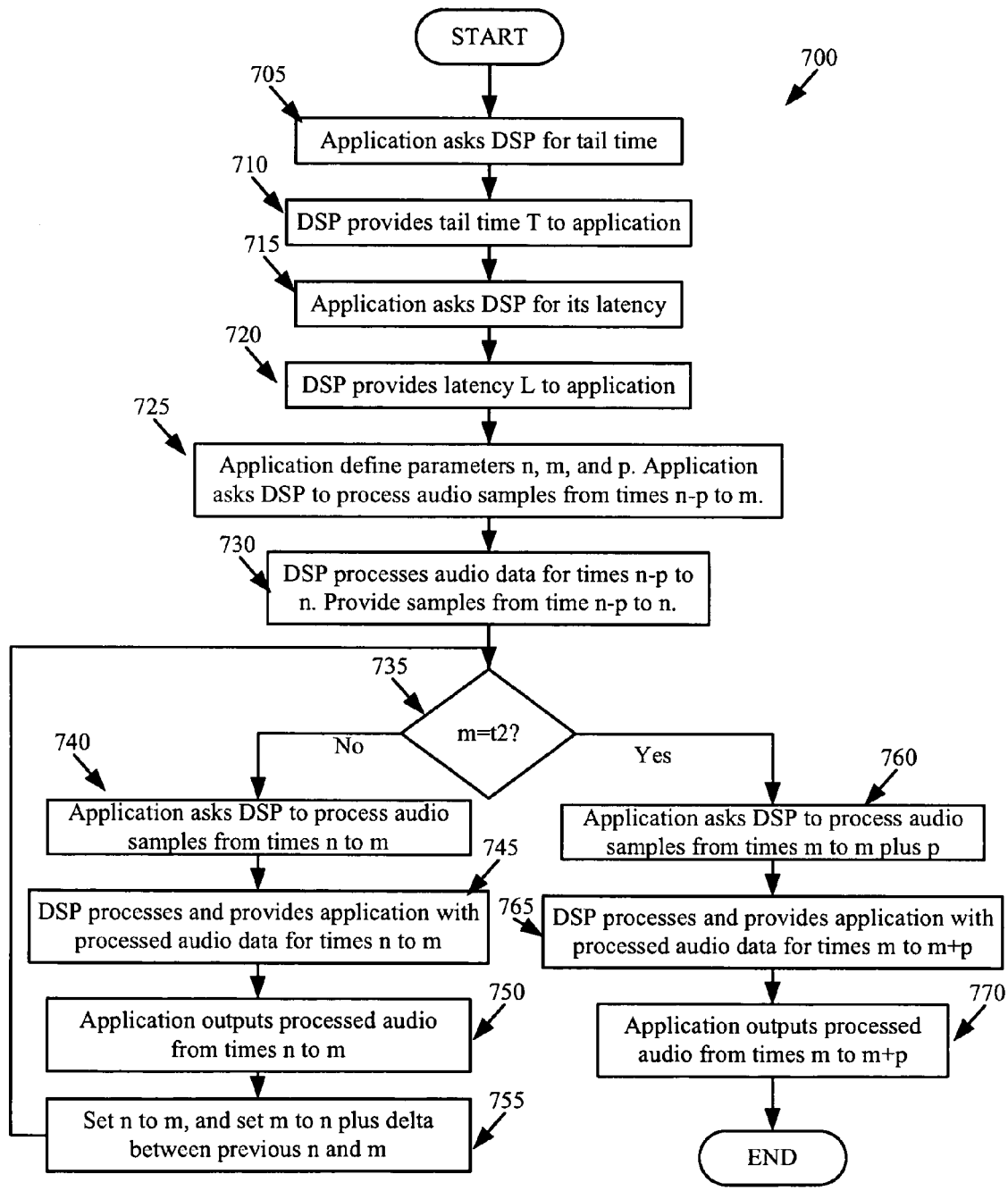
FIG. 7 illustrates a process that accounts for temporal effects on audio while processing the audio in an audio unit that is designed to modify the content of the audio.

FIG. 7 presents a process 700 that conceptually illustrates what is performed by the audio-editing application 120 and an audio unit 110 in order to process audio data within a particular time interval. As further described below, this process considers audio data before and after the particular interval in order to process the audio data during the particular interval. Before describing this process, however, the need to account for audio data outside of the particular interval is described by reference to FIGS. 2-5.

Figure 2:
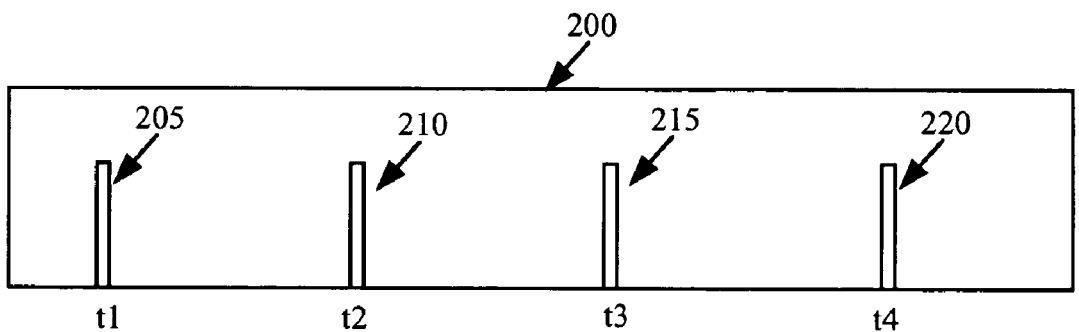
FIGS. 2-5 present different illustrations of an audio track in order to describe the need to account for temporal audio effects.

FIG. 2 illustrates an audio track 200 with four audio events 205, 210, 215, and 220 that occur at four different times, t1, t2, t3, and t4, in the track. Each of the four audio events is an impulse audio signal. In FIG. 2, no DSP effect has been applied to any of the audio events. Hence, none of the audio events results in an audio signal that lasts beyond its duration. In other words, the audio contribution of each event terminates once each event terminates.

Figure 3:
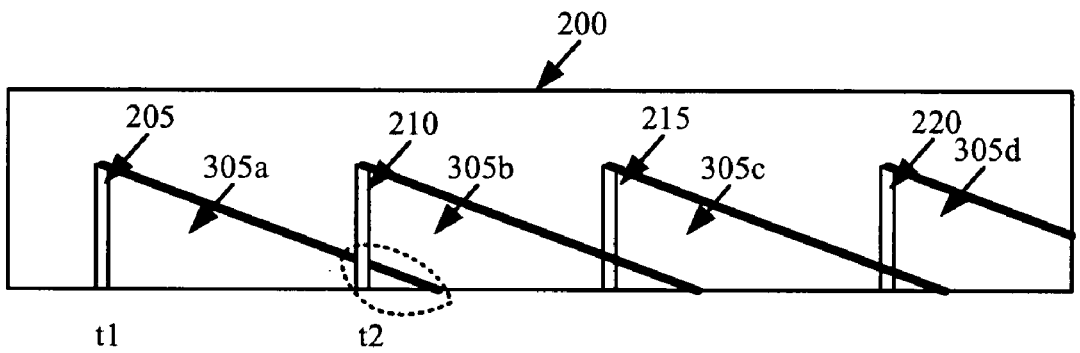
Figure 4:
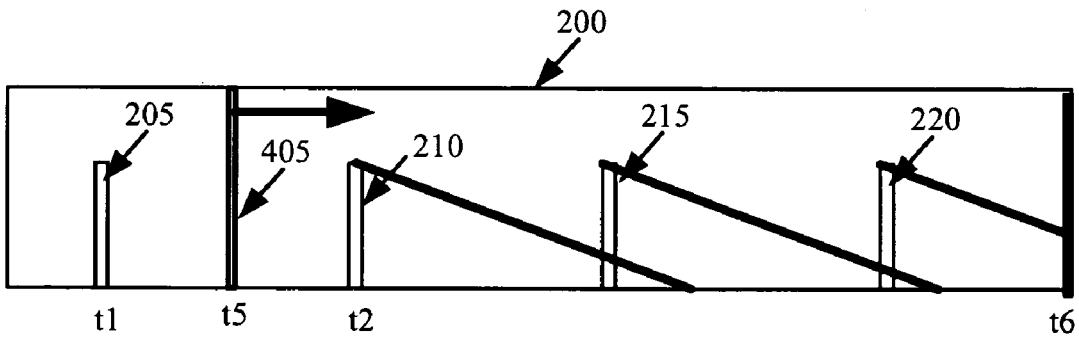
Figure 5:
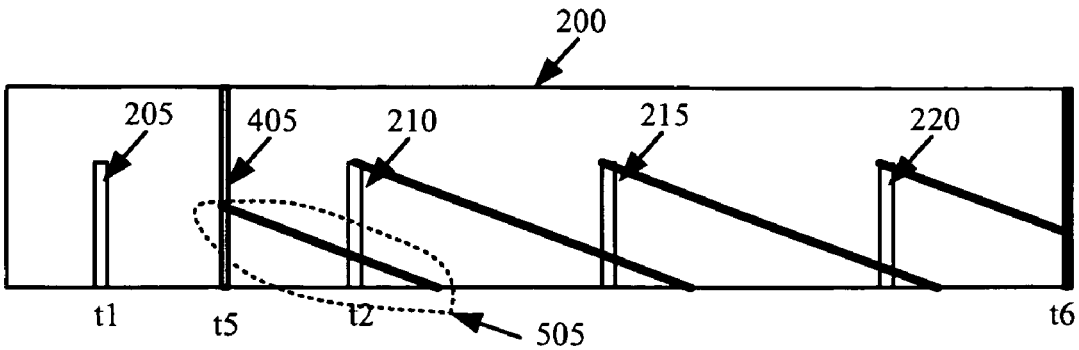

FIG. 3 presents a graph of the audio track 200 after an audio unit has applied a reverb effect to this track. As shown in this figure, this effect generates a reverb audio signal 305 for each audio event. Each reverb signal trails its audio event and decays after its event. In this example, the reverb 305a of the first event 205 overlaps with the second event 210, the reverb 305b of the second event 210 overlaps with the third event 215, and the reverb 305c of the third event 215 overlaps with the fourth event 220. The overlap of a reverb of an initial event with a subsequent event and the subsequent event's reverb modifies the sound that is generated during the subsequent event and the sound that is generated after the subsequent event. FIGS. 3-5 do not show the modification of a subsequent event's reverb due to a previous event's reverb, in order to keep the visual presentation of these examples simple.

FIG. 4 illustrates a graph of the audio track 200 when this track is played from a time t5 to a time t6. This figure illustrates a playhead 405 that is initially positioned at the time t5 on the horizontal time axis of the graph. When the audio track is played, this playhead scrolls across the horizontal time axis to indicate the position in the audio track that is being played at any instant in time. In the example illustrated in FIG. 4, the audio processing applications ignore the reverb signal 305a of the audio event 205 that occurs at time t1, which is before the starting time t5 of the playhead. Hence, in this example, the audio that is played starting at time t5 does not accurately represent the application of the reverb effect on the audio track, as it does not account for audio contributions from audio event 205 before, during, and after the event 210.

Such inaccurate representation can be troublesome for a variety of reasons. For instance, an inaccurate audio representation makes breaking an audio production in different sections that are stored on different media difficult. The missing DSP effects at the start of a tape will create an audible discontinuity when switching to the tape from another tape.

FIG. 5 illustrates a graph of the audio track 200 when this track is played from a time t5 to a time t6. Like FIG. 4, this figure illustrates a playhead 405 that starts on the horizontal time axis at time t5 and scrolls to time t6 while the audio track is playing. However, unlike the example illustrated in FIG. 4, the audio track in FIG. 5 has been processed to account for the reverb signal of the audio event 205 that occurs at time t1, which is before the starting time t5 of the playhead. Specifically, in this example, the audio track has been processed to include the reverb contribution 505 after time t5 of the reverb signal 305a. Hence, in this example, the audio that is played starting at time t5 accurately represents the application of the reverb effect on the audio track, as it accounts for audio contributions 505 from audio event 205 before, during, and after the event 210.

Figure 6:
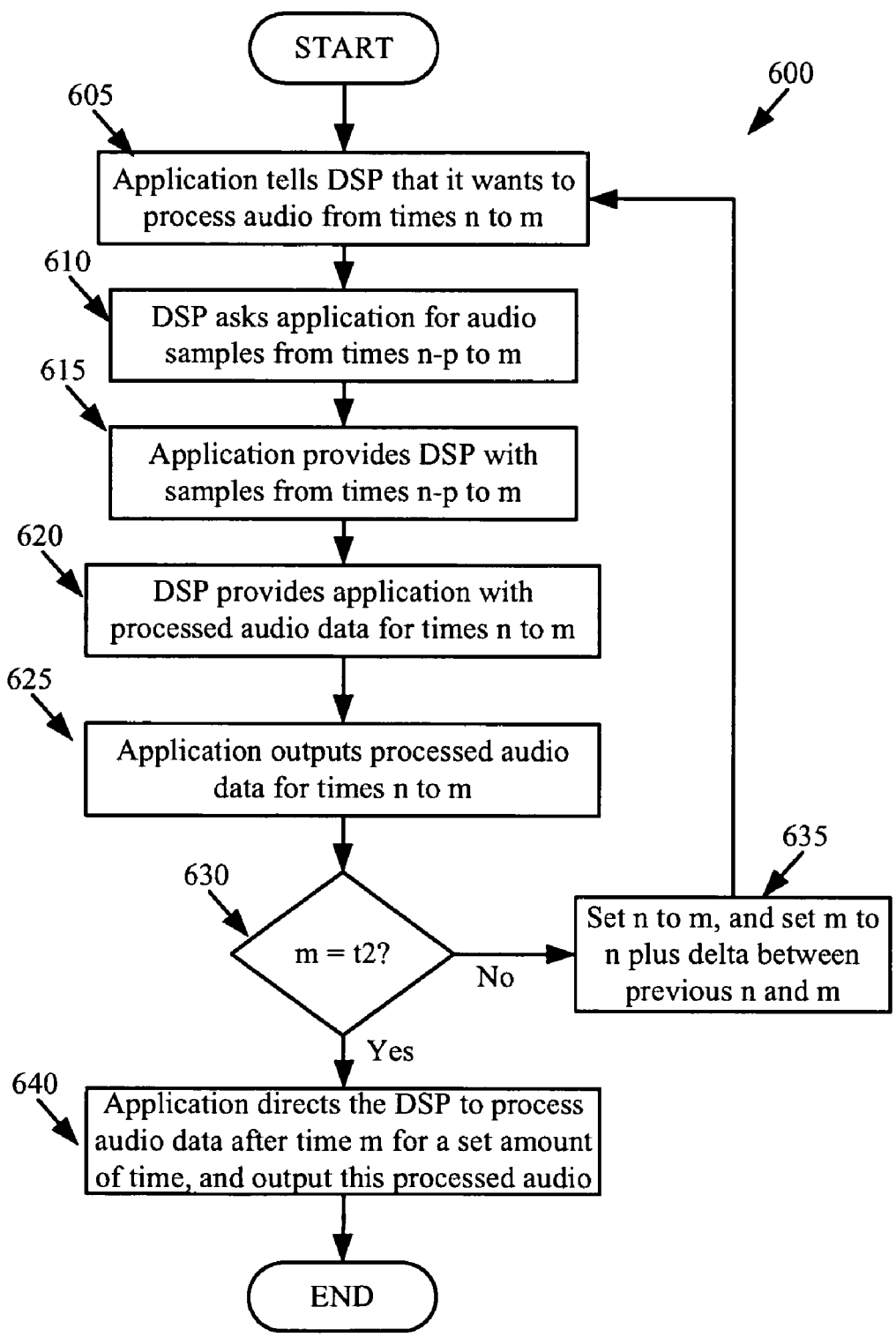
FIG. 6 illustrates one prior art process that renders audio data in a particular interval of and audio track.

FIG. 6 illustrates one prior art process 600 that renders audio data in a particular interval of an audio track. The interval starts at a time t1 and ends at a time t2. This process accounts for audio data before and/or after the particular interval in order to account for temporal effects on audio data that is within the particular interval. This process is performed by an audio-editing application and a DSP.

As shown in FIG. 6, the process 600 starts (at 605) by the audio-editing application informing the DSP that it wants to process audio from times n to m. In the first pass through 605, the process specifies n to equal the start time t1, and m to be t1 plus some fraction of the difference between the start and end times t1 and t2 of the interval.

Next, at 610, the DSP asks the application for audio samples from time n-p to time m, where p is a DSP-computed value that specifies the prior duration of samples that it needs to examine in order to accurately process samples from times n to m. At 615, the application then provides the DSP with the requested samples from times n-p to m. At 620, the DSP then processes the audio and provides the application with processed audio data from times n to m. The application then outputs processed audio data from times n to m.

The application then determines (at 630) whether the variable m equals the end time t2. If not, the application (at 635) sets n to m, and sets m to n plus the difference between the previous n and m. After 635, the process performs 605 and its subsequent operations, which were described above.

When the application determines (at 630) that the variable m equals the end time t2, it directs (at 640) the DSP to process audio data after time m for a set amount of time and outputs this processed audio. After 640, the process ends. The process illustrated in FIG. 6 is inefficient as, each time the DSP is processing a set of samples, it has to ask for samples before this set. It also requires the DSP to identify and use its duration parameter each time.

FIG. 7 illustrates a process 700 of some embodiments of the invention. This process renders audio data in a particular interval of an audio track. The interval starts at a time t1 and ends at a time t2. This process accounts for audio data before and/or after the particular interval in order to account for temporal effects on audio data that is within the particular interval. This process is performed by an audio-editing application and a DSP of an audio unit.

As shown in FIG. 7, the process 700 starts (at 705) when the audio-editing application 120 asks a DSP 125 for the duration of the DSP's impulse response time. This duration is called the effects duration or tail time below. In response, the DSP provides (at 710) its tail time T to the application. The application then asks (at 715) the DSP for its latency duration parameter. This parameter specifies the duration of time that the DSP takes after receiving an audio signal to output a signal related to the received signal. The DSP supplies (at 720) its latency duration parameter L. In the embodiment illustrated in FIG. 7, both the effect and latency duration parameters are expressed in units of time (e.g., they specify 0.5 and 0.2 seconds). In other embodiments, these parameters might be expressed in terms of the number of samples.

Next, at 725, the application defines three variables n, m, and p. Specifically, at 725, the application (1) defines n to be equal to the start time t1, (2) define m to be equal to t1 plus a delta, where the delta is typically much smaller than the difference between the start and end times t1 and t2, and (3) defines p to be equal to T+L. At 725, the application then asks the DSP to process audio samples from times n-p to m.

In response, the DSP processes (at 730) the audio samples from times n-p to n. The nature of this processing depends on the DSP and the DSP's audio unit. Also, processing audio samples is well known in the art, as there are a variety of commonly known techniques for such processing. See, e.g., Digital Audio Signal Processing by Udo Zolzer, published by John Wiley & Son Ltd; (August 1997). In order not to obscure the description of the invention with unnecessary detail, the processing of audio samples by a DSP will not be further described below. At 730, the DSP provides to the application processed audio samples for times n-p to n. In some embodiments, the application discards these samples.

Next, at 735, the audio-editing application determines whether the variable m equals time t2. If not, the application asks (at 740) the DSP to process audio samples from times n to m. In response, the DSP processes (at 745) the audio samples from times n to m. At 745, the DSP also provides the processed audio samples for times n to m to the audio editing application. This application then outputs (at 750) the processed audio samples for times n to m. Outputting the processed audio samples might entail (1) providing an audio presentation to a user based on the processed samples, (2) storing the audio samples, or (3) having another DSP process these samples.

After 750, the audio-editing application then sets n to m, and sets m to n plus the difference between the previous n and m (e.g., if n and m respectively were 2 and 2.1, the application will set n to 2.1 and m to 2.2). From 755, the process transitions back to 735, which was described above.

When the audio-editing application determines (at 735) that m equals time t2, the application has the DSP perform a post-interval processing that is meant to capture properly the temporal effects of samples within the interval from t1 to t2, on samples outside of this interval. Specifically, the application asks (at 760) the DSP to process audio samples from times m to m+p. In response, the DSP processes (at 765) the audio samples from times m to m+p. At 765, the DSP also provides the processed audio samples for times m to m+p to the audio editing application. This application then outputs (at 770) the processed audio samples for times m to m+p. The process 700 then ends.

Although the process 700 is described above in one manner, one of ordinary skill will realize that other embodiments might implement this process differently. For instance, in other embodiments, the application provides (at 760) the DSP with zero samples. In this manner, the application pushes silence through the DSP in order to only receive the trailing audio effect of samples with the interval from t1 to t2, and not involve samples from t2 to t2+p.

The inventive process 700 of FIG. 7 has several advantages. First, it accurately performs audio tail editing, which is important in a variety of contexts. For instance, video editing applications typically break up a movie in two or more different parts and they output each part on a different tape. When this occurs, the audio at the beginning of each tape after the first tape needs to account for trailing effects of the audio at the end of the previous tape. Otherwise, the viewer will discern an audio distortion as the presentation transitions from one tape to another. Second, the process 700 has a DSP publish its tail time and its latency to the editing application. This reduces the amount of processing that the DSP has to perform. It also allows the pre- and post-processing to be more accurate as, for each DSP, this processing is dependent on the DSP's own unique tail and latency times.

Although the process 700 was described above by reference to one DSP, one of ordinary skill will realize that the audio-editing application can perform this process concurrently for several DSPs. For instance, once one DSP finishes processing a set of samples from times n to m, the audio editing application can supply the processed samples to another DSP for processing.

III. Interaction Between the Audio-Editing Application and an Audio Converter

As mentioned above, an audio converter 115 performs a particular set of encoding operations on the audio data that it receives from the application 120. Examples of different encoding operations include re-sampling the audio data, reducing the number of audio samples, increasing the number of audio samples, translating the audio encoding from one standard (e.g., an mp3 format) to another standard (e.g., linear PCM format).

Figure 8:
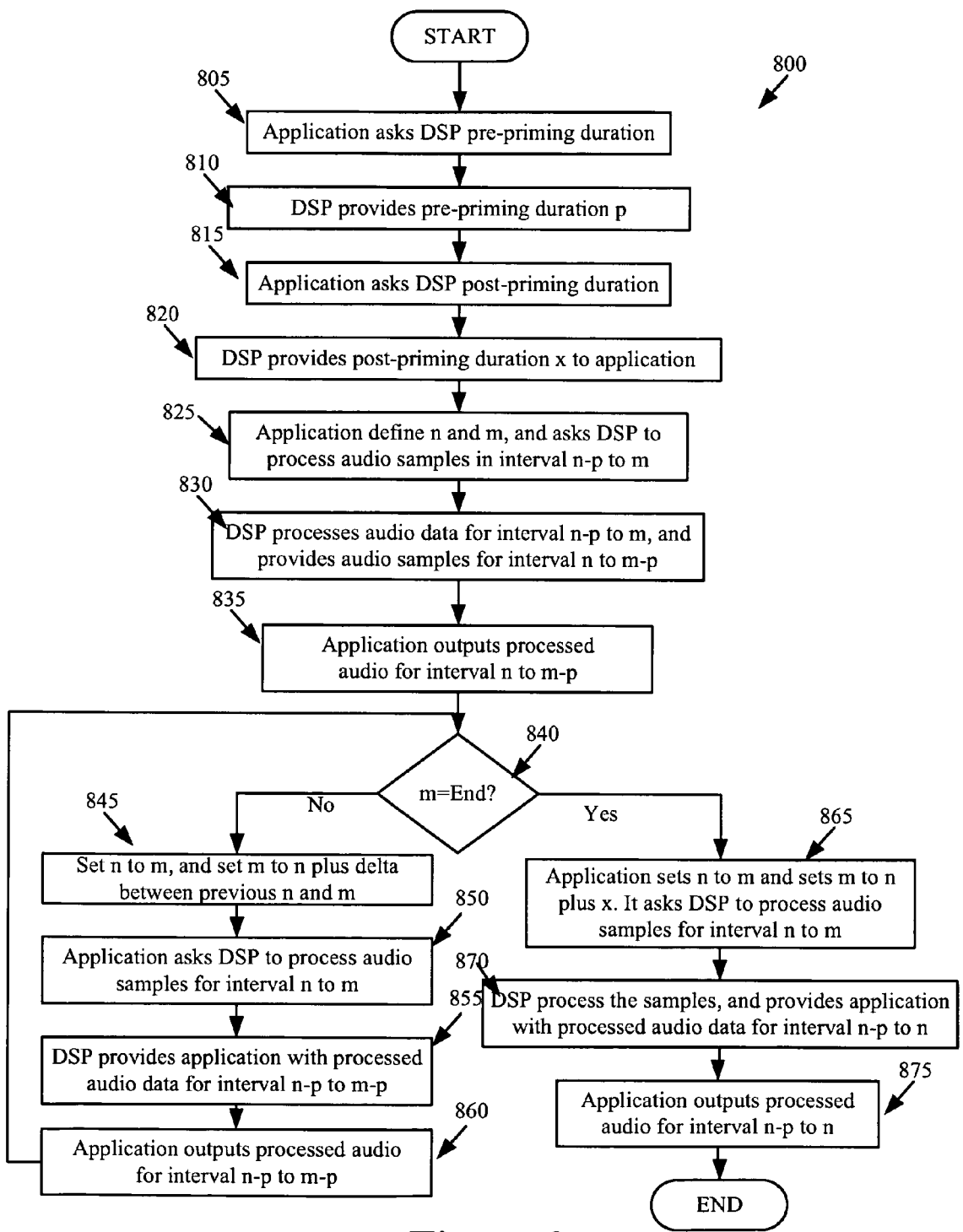
FIG. 8 illustrates an encoding process that in encoding an interval in an audio track examines samples before and after the interval.

To encode audio samples in an interval between time t1 and t2, encoding operations often need to examine samples before time t1 and samples after time t2. FIG. 8 illustrates one such encoding process 800 of some embodiments of the invention. The audio-editing application and a DSP of an audio converter perform this process.

As shown in FIG. 8, the process 800 starts (at 805) when the audio-editing application 120 asks a DSP 125 for the DSP's pre-priming duration parameter. As mentioned above, a pre-priming parameter specifies the duration of audio data to consider before the interval being considered, while a post-priming parameter specifies the duration of audio data to consider after the interval. In some embodiments, the interval is expressed in terms of a temporal duration. In the embodiment illustrated in FIG. 8, the interval is a particular set of samples in the audio track (e.g., samples 500 to 550).

In response to the request, the DSP provides (at 810) its pre-priming parameter p to the audio-editing application. The application then asks (at 815) the DSP for its post-priming parameter. The DSP supplies (at 820) its post-priming parameter x. In the embodiment illustrated in FIG. 8, the pre- and post-priming parameters each specify a number of samples (e.g., 5 and 7 samples). In other embodiments, they can be expressed in terms of a time value (e.g., 0.5 and 0.2 seconds).

Next, at 825, the application defines two variables n and m. Specifically, at 825, the application (1) defines n to be equal to the Start parameter that specifies the start of the interval, and (2) define m to be equal to n plus a delta, where the delta is typically much smaller than the difference between the Start and End parameters that specify the duration of the interval. At 825, the application then asks the DSP to process audio samples in the interval n-p to m.

In response, the DSP processes (at 830) the audio samples in the interval n-p to m. The nature of this processing depends on the DSP and the DSP's audio converter. Also, processing audio samples in an audio converter is well known in the art, as there are a variety of commonly known techniques for such processing. See, e.g., Digital Audio Signal Processing by Udo Zolzer, published by John Wiley & Son Ltd; (August 1997). In order not to obscure the description of the invention with unnecessary detail, the processing of audio samples by an audio converter's DSP will not be further described below. After processing the samples, the DSP provides (at 830) samples for the interval n to m-p to the audio-editing application.

The audio-editing application then outputs (at 835) the received samples for the interval n to m-p. Outputting the processed audio samples might entail (1) providing an audio presentation to a user based on the processed samples, (2) storing the audio samples, or (3) having another DSP process these samples.

Next, at 840, the application determines whether the variable m equals the End parameter that specifies the end of the interval. If not, the application (at 845) sets n to m, and sets m to new n plus the difference between the previous m and the previous n (e.g., if n and m respectively were 2 and 2.1, the application will set n to 2.1 and m to 2.2). The application then asks (at 850) the DSP to process audio samples from times n to m. In response, the DSP processes (at 855) the audio samples from times n-p to m-p. At 855, the DSP also provides the processed audio samples for times n-p to m-p to the audio editing application. This application then outputs (at 860) the processed audio samples for times n-p to m-p. From 860, the process transitions back to 840, which was described above.

When the application determines (at 840) that m equals End, the application directs the DSP to perform a post-processing that is needed to obtain the samples from m-p to m, so that it can complete its processing of the samples that were originally in the interval defined by Start and End in the interval n to m. Specifically, at 865, the application sets n to m, and set m to the new n plus the post-priming parameter x. The application also asks (at 865) the DSP to process audio samples from times n to m. In response, the DSP processes (at 870) these audio samples, and provides to the application audio samples for times n-p to n. At 875, the application then outputs the received processed audio samples and then ends the operation of the process 800.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory computer readable medium storing an audio editing application for processing audio data in a plurality of intervals of an audio track, wherein the application uses an audio processor for the processing of the audio data, the application comprising sets of instructions for:
   receiving from the audio processor an operational parameter of the audio processor;
   identifying a duration from the operational parameter;
   using the duration to identify audio data outside a particular interval;
   directing the audio processor to process the audio data inside the particular interval by accounting for a temporal effect of the identified audio data outside the particular interval on the processing of the audio data inside the particular interval; and reusing the duration to account for a temporal effect on audio data in each of a plurality of intervals that are processed subsequently to the particular interval.

2. The non-transitory computer readable medium of claim 1, wherein the identified audio data outside the particular interval precedes the particular interval.

3. The non-transitory computer readable medium of claim 1, wherein the identified audio data outside the particular interval comes after the particular interval.

4. The non-transitory computer readable medium of claim 1, wherein directing the audio processor comprises directing the audio processor to modify the audio data inside the particular interval to produce a different sound.

5. The non-transitory computer readable medium of claim 1,
   wherein directing the audio processor comprises directing the audio processor to encode the audio data inside the particular interval.

6. The non-transitory computer readable medium of claim 1, wherein the operational parameter comprises a latency parameter of the audio processor.

7. The non-transitory computer readable medium of claim 1, wherein the operational parameter comprises an impulse response parameter of the audio processor.

8. A method for processing audio data in a plurality of intervals of an audio track, the method comprising:
   based on an operational parameter of an audio processor that processes audio data, computing a duration outside of a particular interval that includes audio data that has a temporal effect on the processing of audio data that is within the particular interval;
   directing the audio processor to process the audio data for the particular interval along with audio data for the duration computed for the particular interval; and
   reusing the operational parameter to account for a temporal effect on audio data in each of a plurality of intervals that are processed subsequently to the particular interval,
   wherein said computing, directing, and reusing are performed by an application that edits the audio data of the audio track and are not performed by the audio processor.

9. The method of claim 8, wherein directing the audio processor comprises passing audio data from the particular interval and audio data from outside the particular interval to account for the temporal effect.

10. The method of claim 9, wherein the operational parameter of the audio processor determines a duration of audio data to pass to the audio processor when passing audio data from the particular interval.

11. The method of claim 8 further comprising receiving processed audio data for the particular interval from the audio processor and outputting audio based on the processed audio data for the particular interval.

12. The method of claim 8, wherein directing the audio processor comprises directing the audio processor to modify the audio data in the particular interval to produce a different sound.

13. The method of claim 8, wherein directing the audio processor comprises directing the audio processor to encode the audio data in the particular interval.

14. The method of claim 13, wherein the operational parameter comprises a priming duration for specifying a duration of audio data that is needed for encoding the audio data in the particular interval while accounting for the temporal effect.

15. The method of claim 14, wherein the priming duration comprises a pre-priming duration for specifying a duration of the audio data to consider before the particular interval.

16. The method of claim 14, wherein the priming duration comprises a post-priming duration for specifying a duration of the audio data to consider after the particular interval.

17. The method of claim 8, wherein the application stores the operational parameter of the audio processor for subsequently computing audio data to include with the processing of the audio data in the particular interval to account for the temporal effect.

18. A non-transitory computer readable medium storing an application for editing audio data in a plurality of intervals of an audio track, wherein the application uses an audio processor for processing the audio data, the application comprising sets of instructions for:
  using an operational parameter of the audio processor to compute for a particular interval a duration outside of the particular interval that includes audio data that has a temporal effect on the processing of the audio data that is within the particular interval; and
  directing the audio processor to process the audio data for the particular interval along with the audio data for any duration computed for the particular interval; and
  reusing the operational parameter to account for a temporal effect on audio data in each of a plurality of intervals that are processed subsequently to the particular interval.

19. The non-transitory computer readable medium of claim 18, wherein the audio processor comprises a digital signal processor (DSP).

20. The non-transitory computer readable medium of claim 18, wherein the application further comprises a set of instructions for receiving, from the audio processor, data identifying the operational parameter.

21. The non-transitory computer readable medium of claim 18, wherein the application further comprises a set of instructions for using the audio processor to apply sound effects to the audio data.

22. The non-transitory computer readable medium of claim 18, wherein the application further comprises a set of instructions for using the audio processor to re-encode the audio data.

23. The non-transitory computer readable medium of claim 22, wherein the application further comprises a set of instructions for changing a sampling rate of the audio data.

24. The non-transitory computer readable medium of claim 22, wherein the application further comprises a set of instructions for changing the audio data from one file format to another file format.

25. A non-transitory computer readable medium storing an application for editing audio data in a plurality of intervals of an audio track, wherein the application uses an audio processor for encoding the audio data, the application comprising sets of instructions for:
  receiving from the audio processor an operational parameter of the audio processor;
  using the operational parameter to compute a duration outside of a particular interval that includes audio data that has a temporal effect on the encoding of the audio data that is within the particular interval; and
  directing the audio processor to encode the audio data for the particular interval along with the audio data for the computed duration; and reusing the operational parameter to account for a temporal effect on audio data in each of a plurality of intervals that are processed subsequently to the particular interval.

26. The non-transitory computer readable medium of claim 25, wherein the operational parameter comprises a priming duration for specifying a duration of audio data that is needed for encoding the audio data in the particular interval while accounting for the temporal effect.

27. The non-transitory computer readable medium of claim 26, wherein the priming duration comprises a pre-priming duration for specifying a duration of the audio data to consider before the particular interval.

28. The non-transitory computer readable medium of claim 26, wherein the priming duration comprises a post-priming duration for specifying a duration of the audio data to consider after the particular interval.

29. The non-transitory computer readable medium of claim 25, wherein the sets of instructions for computing the duration comprises sets of instructions for computing the duration based on the operational parameter of the audio processor.

* * * * *